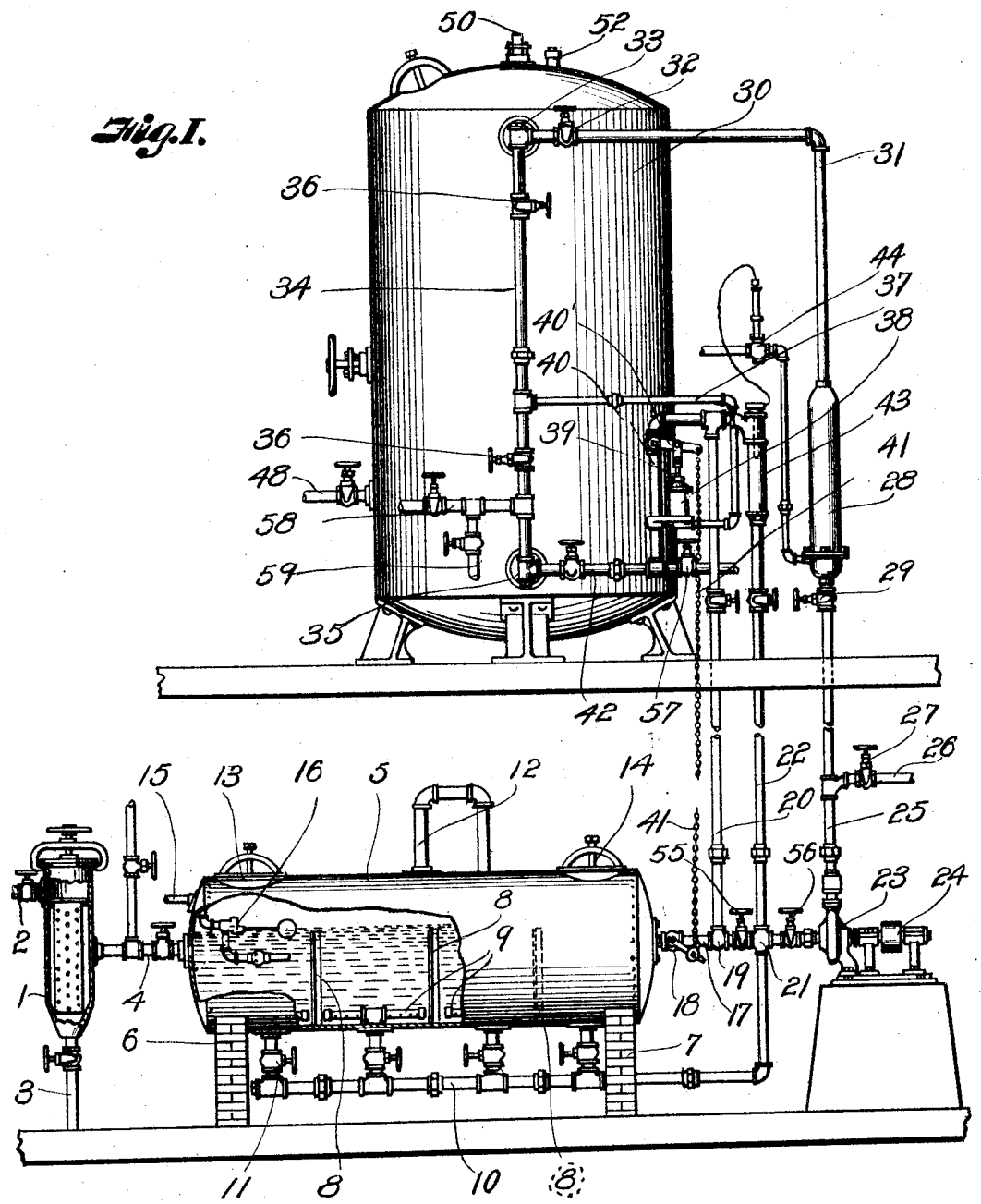

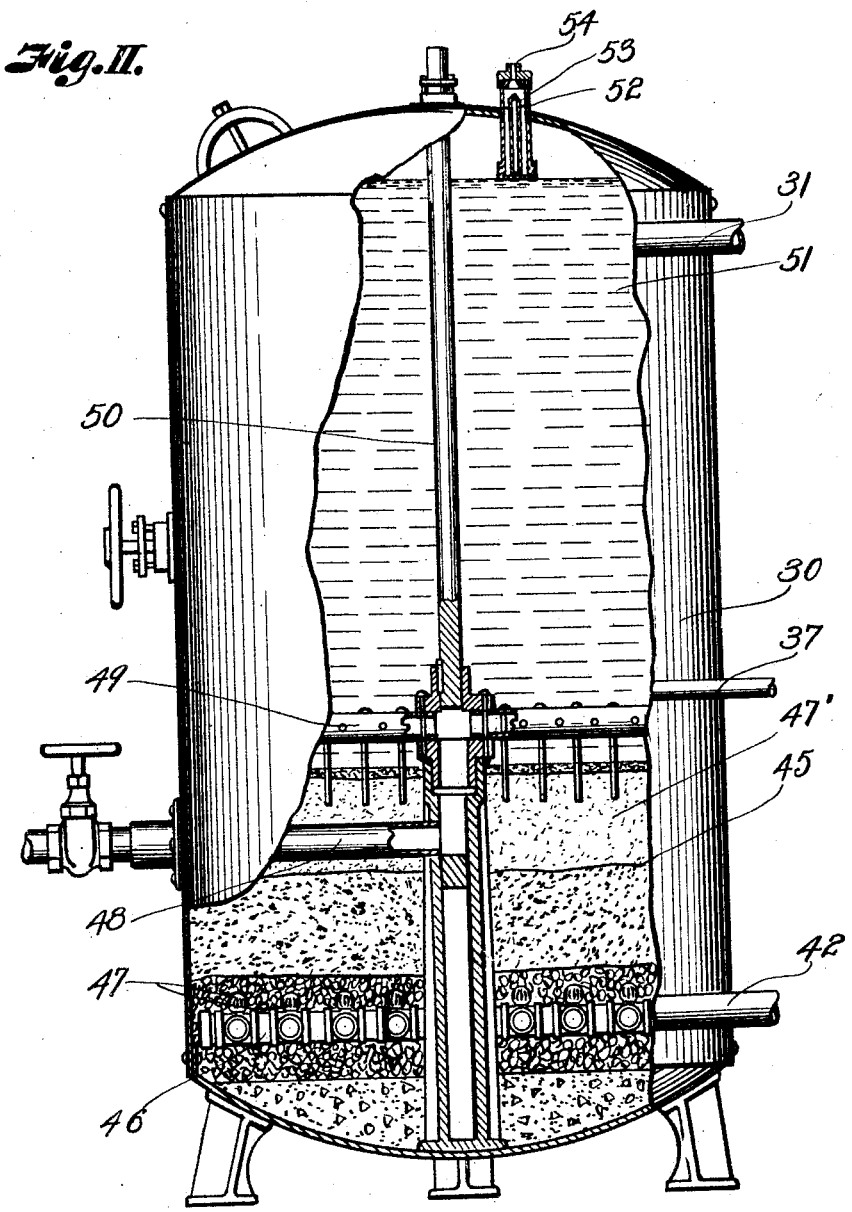

UNITED STATES PATENT OFFICE.

JOHN E. CAPS, OF WILMETTE, ILLINOIS.

LIQUID-TREATING APPARATUS.

1,413,898.  Specification of Letters Patent.  Patented Apr. 25, 1922.

Application filed August 11, 1919. Serial No. 316,734.

*To all whom it may concern:*

Be it known that I, JOHN E. CAPS, a citizen of the United States, residing at Wilmette, in the county of Cook and State of Illinois, 329 4th St., have invented certain new and useful Improvements in Liquid-Treating Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates generally to the purification of liquids, the primary object being to provide means whereby the insoluble materials contained therein may be disassociated therefrom in an efficient manner.

The invention particularly relates to the conservation of the detergent content of the wash water used in laundries.

It is generally the practice in laundries to convey the "suds" from the washers to a sewer, and since these "suds" have a very high "soap" content, it is obvious that the operating cost of the laundry would be materially lessened if the valuable soap content could be recovered to be reintroduced to the washers. I provide means for accomplishing the recovery of the detergent or soap content of the "suds" in an efficient and expeditious manner, and I would have it understood that, while my invention is primarily intended for treating "suds" as it comes from the washers of laundries, it is also applicable for other uses. For example, I have actually utilized my invention in the treatment of water to be manufactured into ice and certain ramifications of my invention contemplates its adaption to either use.

In the drawings:

Figure I is an elevational view of an apparatus constructed in accordance with my invention, parts of the trap and settling tank being broken away to illustrate the interior thereof;

Figure II is a view partly in section, and partly in elevation of a filter incorporated in the apparatus.

Referring now to the drawings by numerals of reference. 1 designates a trap into which the "suds" from the washers enter through inlet port 2. The trap may be of any approved construction and it is shown as provided with a valved flow off pipe 3 so that suds passing into the trap may be discharged into a sewer if desired. Ordinarily, however, a pipe 4 effects communication between the trap 1 and a settling tank 5 shown as consisting of a cylindrical tank supported upon the masonry settings 6 and 7.

The tank 5 is provided with upstanding baffles 8 extending a suitable distance above the bottom of the tank as shown, so as to arrest the insoluble material in the suds and cause it to be precipitated to the bottom of the tank from which it can be drawn off through pipes 9 communicating with a manifold 10 and to the sewer as will be presently explained, it being apparent by reference to Figure I that communication may be closed between the manifold 10 and drain pipes 9, by means of the valves 11. The tank 5 is provided with an over-flow pipe 12 and covered man holes 13 and 14 of obvious construction.

It is desirable to maintain a constant liquid level in the tank 5 and it is sometimes necessary to augment the supply from the washers by liquid from an external source, and to this end I have provided an auxiliary supply pipe 15 discharging into the tank and controlled by a float actuated valve 16 operating to admit liquid into the tank when the supply falls below a determined level, but closing off when the level is raised high enough.

A pipe 17 leads from the tank 5 and it is provided with a lever operated valve 18, a three way coupling 19 communicating with a pipe 20, and a four way union 21 communicating with manifold 10 and pipe 22, and said pipe 17 communicates with a pump casing 23, the impeller of which may be driven through the medium of the pulley 24, as will be well understood.

The pump discharges into a pipe 25 adapted to communicate with a branch pipe 26 when the valve 27 is in open position, but adapted to communicate with a heater casing 28 when valve 27 is closed and valve 29 is open. The heater is adapted to communicate wth the top portion of the casing 30 of a filter through a pipe 31 provided with a valve 32, so that the pipe 31 may be closed if desired. The pipe 31 is connected to a port 33 also in communication with the vertical pipe 34, which has communication with the bottom of the filter through a port 35 and pipe 34 is provided with valves 36 and 36' so that the lower part of pipe 34 may be closed by valve 36 and the upper part of pipe 34 may be opened to permit pressure in filter shell 30, to pass through pipe 37 to operate a plunger in cylinder 38 and thereby cause piston rod 39 to actuate lever operated valve 40' in pipe 40 to open position and through the flexible connection 41 (shown as a chain) with the lever actuated valve 18 to close off communication through pipe 17; the reverse operation of the valves 18 and 40' taking place when the piston recedes in the cylinder 38.

By reference to Figure I, it will be observed that pipe 40 communicates with an off-take pipe 42 and with a thermostat casing 43 connected to the pipe 17 by a pipe 22, the pipe 40 being also connected to the pipe 17 through pipe 20. The thermostat in case 43 is effective to operate a steam cock in steam pipe 44 under certain conditions so that steam may enter the heater 28 when necessary to raise the temperature of the "suds" passing through casing 28, as will be explained hereinafter.

The filter casing 30 may contain a filter bed 45 of different stratified layers, the outlet pipe 42 communicating with the coil 46 to which the filtered water may pass through the slotted members 47 (see Figure II) and the zone adjacent to the top layer 47' of sand or filtering material may communicate with a waste pipe 48 so that when the agitator 49 is actuated by the stem 50, all impurities may be drawn off.

In the top of the water space 51, and preferably projecting through the top, is an air relief valve consisting of the casing 52 in which is a float actuated air valve 53, designed to close the air escape port 54 when the water level reaches a determined height in tank 30, leaving only enough air in the top of the tank or casing to produce an air cushion. Therefore, all unnecessary air will be excluded from the main body of water, there being a material advantage in preventing the saponified water from becoming aerated.

In actual practice, the "suds," containing all the removed dirt, will be fed into the trap and discharged therefrom into the settling tank 5, where the sediment may be precipitated by the baffles 8, the accumulated sediment being removed from time to time through pipes 9 and manifold 10. The pump 23 will create a suction for that purpose and discharge the sediment and some water through pipes 25 and 26. Under normal conditions, however, the water from which the heavier particles have been settled out, will pass out through pipe 17 and through pump 23, up through pipe 25, through casing 28, through pipe 31, into the filter, it being understood that the valves 18, 55, and 56 in pipe 17, during this time, are open.

As the water level rises in the tank 30, the air will be expelled from the tank through port 54 by the rising column of water, until the water level is high enough to actuate float valve 53 when the port 54 will be closed and the remaining air will act as a cushion to create pressure upon the volume of water in the tank. When the pressure has been built up sufficiently (which will be when the tank 30 is substantially full), the pressure exerted through pipes 34 and 37 will actuate the piston in cylinder 38 so as to move the arm of lever actuated valve 40' and open communication through pipes 42 and 40 to allow the water to flow into thermostat casing 43, to pipe 22, to 17, to pump 23, to pipe 25, heater 28, pipe 31, back to tank 30, so as to provide a closed circulation system, it being understood that when the piston in cylinder 38 acts to open valve 40', the chain 41 will cause the valve 18 to close.

It is understood that the treated water is to be maintained at a temperature sufficiently high to prevent the soapy content in the water from coagulating or forming a coating upon the top of the filter bed, so I have provided means whereby, whenever the temperature of the water falls below a determined value, the thermostat will cause the valve 44 to unseat and admit steam to the heater casing 28, and thereby raise the temperature of the water to the desired degree. It will be observed that the thermostat is far enough in advance of the heater to anticipate the requirements of the water before it gets to the heater, and so as to admit steam to the cooled water before it reaches the filter tank 30. When the temperature of the water is sufficiently high, the thermostat will cause the valve 44 to close and cut off the supply of augmenting steam, but the system will remain closed so that the liquid under treatment may pass through the filter a number of times sufficient to accomplish the desired purpose of freeing the "suds" of extraneous matter, whereupon the valve 57 in pipe 42 may be opened to permit the treated "suds" to pass back to the service pipes leading to the washers.

Steam and water from a jet pump may pass into the filter through pipe 58, and air may be admitted through pipe 59.

It is desirable that the "suds" initially pass into the tank 30 at a temperature high enough to prevent coagulation of the soapy content, and to this end the water may at first pass from the tank 5 to pipe 17, to pipe 20, through thermostat 43, to pipe 22, to pump 23, to pipe 25, through heater 28, and thence to the filter casing 30. When the filter casing 30 contains enough "suds" to build up the desired pressure, the piston in cylinder operates valve 40′ to open position, and valve 18 to closing position, so the closed system hereinbefore described may become effective.

Attention is called to the fact that the pressure of the air upon the volume of liquid will be effective in squeezing out any entrained air so that the liquid will be substantially free of air. This is particularly important in treating water preparatory to the manufacture of ice, as the presence of air in the water causes the apparent translucent effect in the manufactured product which is so objectionable.

Attention is also directed to the fact that it is best to always leave valve 53 slightly open so that the pump may be primed.

What I claim and desire to secure by Letters-Patent, is:

1. A liquid supply, a filter, a conduit connecting the supply to the inlet of the filter, a pump in the conduit to maintain a flow from the supply to the filter, a pipe connecting the discharge end of the filter to the conduit, a normally closed valve therein, a valve in the conduit adjacent to the outlet of the supply, and a pressure responsive device actuated by pressure in the filter to unseat the normally closed valve to establish communication between the discharge of the filter and the conduit and to close the valve in the conduit adjacent to the outlet of the supply.

2. In a device of the class described, a settling tank, a filter, a pipe communicating with the settling tank and the filter, a pump in the pipe, normally closed means for feeding the liquid from the discharge end of the filter to the pump, and means responsive to pressure in the filter to close the discharge end of the settling tank and open the normally closed means.

3. In a device of the class described, a settling tank, a filter, a pipe communicating with the settling tank and the filter, a pump in the pipe, normally closed means for feeding the liquid from the discharge end of the filter to the pump, means responsive to pressure in the filter to close the discharge end of the settling tank and open the normally closed means, and means for regulating the air cushion in the filter above the column of water therein, said means comprising a float actuated air relief valve adapted to close when the liquid level in the tank reaches a determined level.

4. In a device of the class described, a tank, a discharge pipe leading therefrom, a pump communicating with said pipe, a filter, a pipe leading from the pump to the filter, a branch pipe connected to the discharge pipe, a discharge from the filter connected to the branch pipe, a valve in the filter discharge connection normally closed, a valve in the tank discharge pipe normally open, and a pressure device actuated by pressure in the filter for causing the valve in the filter discharge connection to open and to cause the valve in the tank disharge to close.

5. A source of water supply, a pump into which the water is conveyed, a heater casing connected to the discharge end of said pump, a filter having an inlet communicating with said heater, a discharge pipe for the filter connected to the pump casing, a pressure actuated device having movement in response to the pressure created in the filter, a valve connected to the pressure device to open communication between the filter and the pump and a valve to close off communication between the source of water supply and the pump synchronously with the opening of the first named valve and vice versa.

In testimony whereof I affix my signature.

JOHN E. CAPS.